(12) United States Patent
Kagami et al.

(10) Patent No.: US 10,676,132 B2
(45) Date of Patent: Jun. 9, 2020

(54) SUSPENSION MEMBER (71) Applicant: TOYOTA JIDOSHA KABUSHIKI KAISHA, Toyota-shi, Aichi-ken (JP)

(72) Inventors: Ayaka Kagami, Inazawa (JP); Kazuki Shimizu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/634,065

(22) Filed: Jun. 27, 2017

(65) Prior Publication Data
US 2018/0009480 A1 Jan. 11, 2018

(30) Foreign Application Priority Data

Jul. 6, 2016 (JP) .................................. 2016-134405
Dec. 16, 2016 (JP) .................................. 2016-243978

(51) Int. Cl.
*B62D 21/11* (2006.01)
*B62D 29/00* (2006.01)

(52) U.S. Cl.
CPC .............. *B62D 21/11* (2013.01); *B62D 29/00* (2013.01); *B60G 2206/60* (2013.01); *B60G 2206/7102* (2013.01); *B62D 29/008* (2013.01)

(58) Field of Classification Search
CPC .. B62D 21/11; B62D 29/008; B60G 2206/60; B60G 2206/604; B60G 2206/7102
See application file for complete search history.

(56) References Cited

U.S. PATENT DOCUMENTS

| | | | | |
|---|---|---|---|---|
| 3,913,696 A * | 10/1975 | Kennedy | ................... | B60G 7/02 180/292 |
| 5,573,274 A * | 11/1996 | Koketsu | ................. | B62D 21/11 180/297 |
| 6,109,654 A * | 8/2000 | Yamamoto | ........... | B62D 21/152 180/299 |
| 6,409,216 B2 * | 6/2002 | Suzuki | ..................... | B60G 7/02 280/124.109 |
| 6,511,096 B1 * | 1/2003 | Kunert | ..................... | B60G 7/02 280/124.109 |
| 2001/0040387 A1 * | 11/2001 | Takagi | .................... | B62D 21/11 296/204 |
| 2003/0080587 A1 | 5/2003 | Kitagawa | | |
| 2006/0278463 A1 | 12/2006 | Anzai et al. | | |
| 2006/0284449 A1 * | 12/2006 | Miyahara | ............... | B62D 21/11 296/204 |
| 2012/0319389 A1 * | 12/2012 | Takahashi | .............. | B62D 21/11 280/781 |

(Continued)

FOREIGN PATENT DOCUMENTS

DE 19920051 A1 * 11/2000 ......... B60G 21/0551
FR 2614000 A1 * 10/1988 .............. B60G 3/06
(Continued)

*Primary Examiner* — Ruth Ilan
(74) *Attorney, Agent, or Firm* — Oliff PLC (57) ABSTRACT

A suspension member includes: a front frame including a front cross member extending in a vehicle width direction; a rear frame at least partially made of light metal and including a rear cross member extending in the vehicle width direction, the rear frame being placed on a vehicle rear side of the front frame and joined to the front frame; and a protective member joined to the rear cross member so as to form a closed section together with the rear cross member.

7 Claims, 11 Drawing Sheets

(56) References Cited

U.S. PATENT DOCUMENTS

| | | | |
|---|---|---|---|
| 2013/0249250 A1* | 9/2013 | Ohhama | B62D 21/11 296/204 |
| 2014/0049032 A1* | 2/2014 | Urata | B62D 21/02 280/795 |
| 2014/0110925 A1* | 4/2014 | Goellner | B62D 21/155 280/781 |
| 2014/0248508 A1 | 9/2014 | Ohhama et al. | |
| 2014/0300137 A1* | 10/2014 | Komiya | B62D 21/11 296/187.11 |
| 2014/0312655 A1* | 10/2014 | Takahashi | B62D 21/11 296/204 |
| 2015/0166104 A1 | 6/2015 | Ohhama et al. | |
| 2015/0298742 A1* | 10/2015 | Ono | B62D 21/11 296/187.09 |
| 2016/0039464 A1* | 2/2016 | Hirano | B62D 21/11 180/312 |
| 2016/0200361 A1* | 7/2016 | Goto | B62D 25/088 296/203.01 |
| 2016/0375938 A1* | 12/2016 | Matsuo | B62D 21/11 296/204 |
| 2017/0008565 A1* | 1/2017 | Murata | B62D 21/11 |
| 2017/0029038 A1* | 2/2017 | Sato | B62D 25/2018 |
| 2017/0066301 A1* | 3/2017 | Terashima | B60G 21/0551 |
| 2017/0129540 A1* | 5/2017 | Toller | B62D 21/11 |
| 2017/0197662 A1* | 7/2017 | Nakamoto | B62D 21/02 |
| 2018/0037263 A1* | 2/2018 | Kanasugi | B62D 29/008 |
| 2018/0105213 A1* | 4/2018 | Kagami | B62D 21/155 |

FOREIGN PATENT DOCUMENTS

| | | | |
|---|---|---|---|
| JP | 2003-127893 A | 5/2003 | |
| JP | 2004-344955 A | 12/2004 | |
| JP | 2005-289115 A | 10/2005 | |
| JP | 2007-002857 A | 1/2007 | |
| JP | 2008-120390 A | 5/2008 | |
| JP | 2014-168804 A | 9/2014 | |
| JP | 2016-060311 A | 4/2016 | |
| JP | 2017-081225 A | 5/2017 | |
| WO | WO-2006040741 A1 * | 4/2006 | B62D 21/11 |
| WO | WO-2013145549 A1 * | 10/2013 | B62D 21/11 |
| WO | 2014/017260 A1 | 1/2014 | |
| WO | WO-2014017167 A1 * | 1/2014 | |

* cited by examiner

SUSPENSION MEMBER

INCORPORATION BY REFERENCE

The disclosure of Japanese Patent Application No. 2016-134405 filed on Jul. 6, 2016 and Japanese Patent Application No. 2016-243978 filed on Dec. 16, 2016, each including the specification, drawings and abstract, is incorporated herein by reference in its entirety.

BACKGROUND

1. Technical Field

The present disclosure relates to a suspension member.

2. Description of Related Art

There have been conventionally proposed various configurations of a suspension member. For example, Japanese Patent Application Publication No. 2014-168804 (JP 2014-168804 A) discloses a suspension member configured such that a front frame is formed by pressing a steel sheet material and a rear frame is formed by performing die-casting molding on light metal.

SUMMARY

Like the technique described in JP 2014-168804 A, the rear frame formed by the die-casting molding of light metal has a relatively low elongation. On this account, when an impact such as interference with a load surface or an obstacle on the road surface is input, the rear frame is easily damaged.

The present disclosure provides a suspension member that can reduce damage of a rear frame by an impact input from outside.

An aspect of the present disclosure provides a suspension member. The suspension member according to the aspect of the present disclosure includes: a front frame including a front cross member extending in a vehicle width direction; a rear frame at least partially made of light metal and including a rear cross member extending in the vehicle width direction, the rear frame being placed on a vehicle rear side of the front frame and joined to the front frame; and a protective member joined to the rear cross member so as to form a closed section together with the rear cross member.

In the above aspect, the protective member forms a closed section together with the rear cross member. Accordingly, it is possible to increase the rigidity of the rear cross member, thereby restraining a damage when a load is applied to the rear cross member.

In the aspect of the present disclosure, at least one of the rear cross member and the protective member may be partially made of iron.

With the above configuration, at least one of the rear cross member and the protective member is partially made of iron having a strength higher than light metal, so that the strength of the closed section formed by the rear cross member and the protective member is made higher. Accordingly, it is possible to restrain the breakage of the rear cross member just by the increase in the strength at the time when an impact load is partially applied to the rear cross member.

In the aspect of the present disclosure, the protective member may be joined to a front end and a rear end of the rear cross member in a vehicle front-rear direction so as to form the closed section.

With the above configuration, the protective member is joined to the front end and the rear end of the rear cross member in the vehicle front-rear direction, so as to form a closed section. Accordingly, in comparison with a case where a closed section is formed such that the protective member is joined to the intermediate part of the rear cross member in the vehicle front-rear direction, it is possible to enlarge the closed section. This makes it possible to increase the rigidity of the rear cross member. Accordingly, it is possible to restrain the breakage of the rear cross member just by the increase in the rigidity at the time when an impact load is partially applied to the rear cross member.

In the aspect of the present disclosure, the rear cross member may include a forward rear cross portion made of iron at a position including a center of the rear cross member, in the vehicle width direction, on a front side of the rear cross member in a vehicle front-rear direction; and a front closed section may be formed by the protective member and the forward rear cross portion.

In the above aspect, the forward rear cross portion is made of iron and forms a front closed section together with the protective member. This makes it possible to increase the strength and the rigidity of the rear cross member. Accordingly, even if a power unit or the like, for example, collides with the forward rear cross portion at the time of a front collision of the vehicle, it is possible to restrain the breakage of the rear cross member just by the increase in the strength and the increase in the rigidity.

With the above configuration, the breakage is restrained at the time when a load is applied to the rear cross member. Accordingly, it is possible to keep a reaction force applied to a collision object such as a power unit, thereby making it possible to absorb an impact appropriately.

In the aspect of the present disclosure, the protective member may be made of light metal and may cover a front end and a forward bottom face of the rear cross member in a vehicle front-rear direction.

In the above aspect, an impact such as interference with a load surface or an obstacle on the road surface is input into the protective member constituting a closed section on a lower front side of the rear cross member. The protective member is made of light metal and forms a closed section together with the rear cross member. Accordingly, in comparison with a case where the closed section is not formed, the rigidity of the protective member improves. Accordingly, even if the protective member is made of light metal, it is possible to secure the rigidity. Further, when the protective member is made of light metal, it is possible to reduce the mass of the member forming the closed section. Accordingly, when the protective member is made of light metal, it is possible to receive an impact from outside by the protective member in a state where the mass efficiency of a section perpendicular to the vehicle width direction is improved.

With the above configuration, it is possible to achieve a weight reduction of the suspension member.

In the aspect of the present disclosure, the closed section may be formed over a whole length of the rear cross member in a longitudinal direction of the rear cross member; and the closed section may be partially made of iron in a whole area of the rear cross member in the longitudinal direction of the rear cross member.

In the aspect of the present disclosure, the protective member may be positioned on a lower side of the rear cross member in a vehicle up-down direction; the protective member may be connected to a front end of the rear cross member in a vehicle front-rear direction from a front side in the vehicle front-rear direction; and the protective member may be connected to a surface of the rear cross member on a lower side of the rear cross member in the vehicle up-down direction or a rear end of the rear cross member in the vehicle front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

The following describes an embodiment of the disclosure in detail with reference to the drawings. Note that, for convenience of description, in each of the drawings, an arrow UP indicates a vehicle-body upward direction, an arrow FR indicates a vehicle-body forward direction, and an arrow RH indicates a vehicle-body right direction as appropriate. Further, in the following description, in a case where an up-down direction, a front-rear direction, and a right-left direction are described without any special description, they respectively indicate up and down of a vehicle-body up-down direction, front and rear of a vehicle-body front-rear direction, and right and left of a vehicle-body right-left direction (a vehicle width direction).

Figure 1:
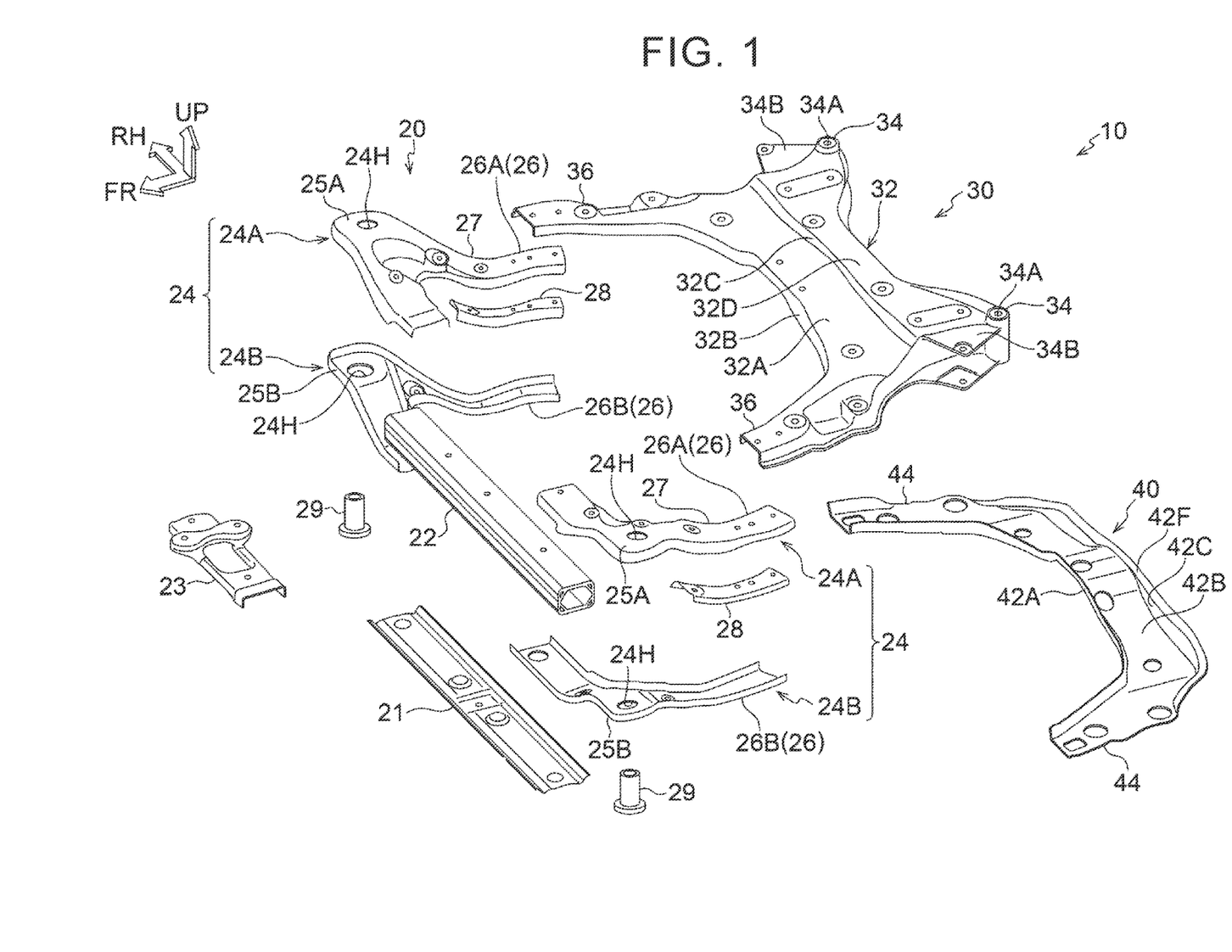
FIG. 1 is a partially exploded perspective view illustrating a suspension member of a first embodiment when viewed from above.
Figure 2:
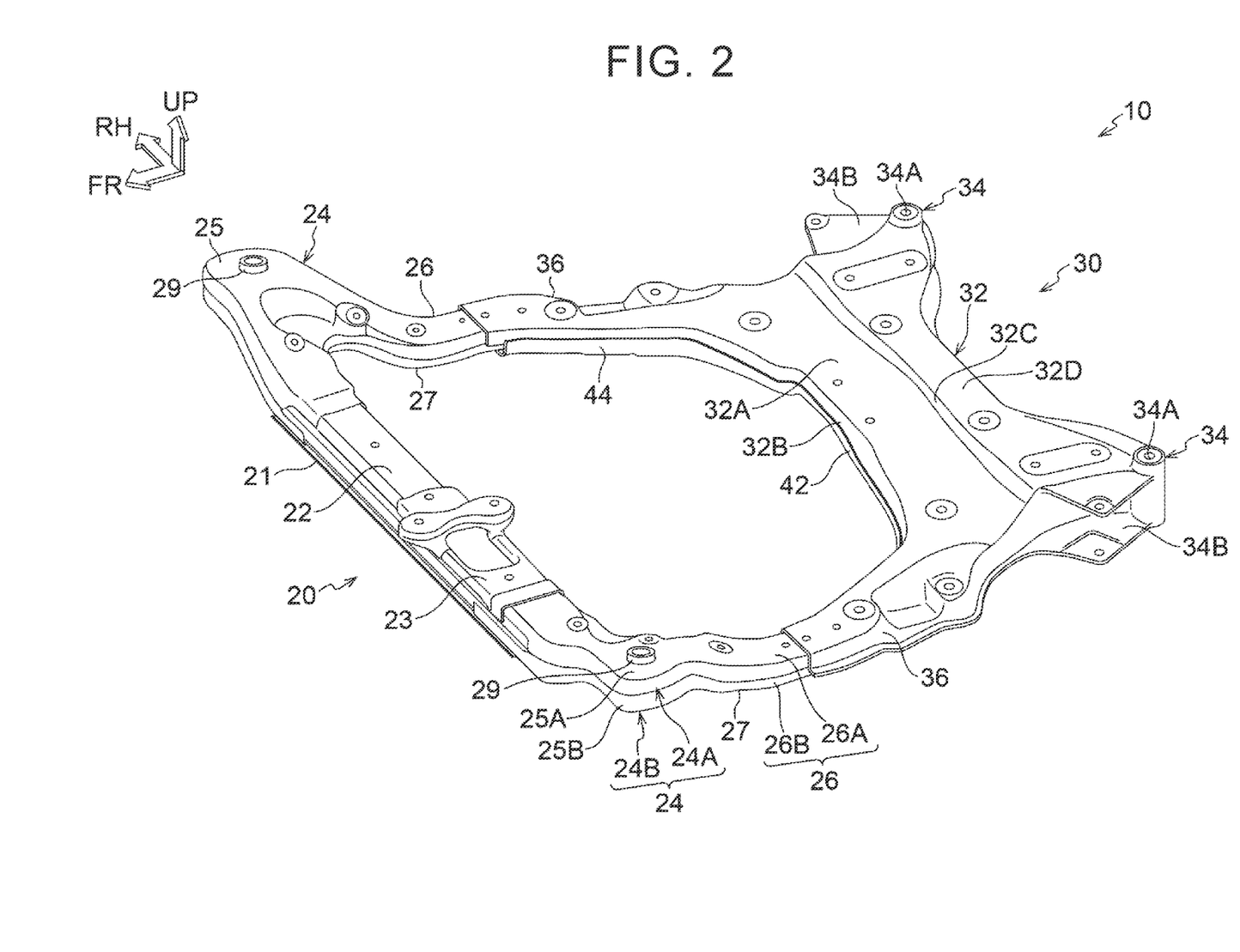
FIG. 2 is a perspective view illustrating the suspension member of the first embodiment when viewed from above.
Figure 3:
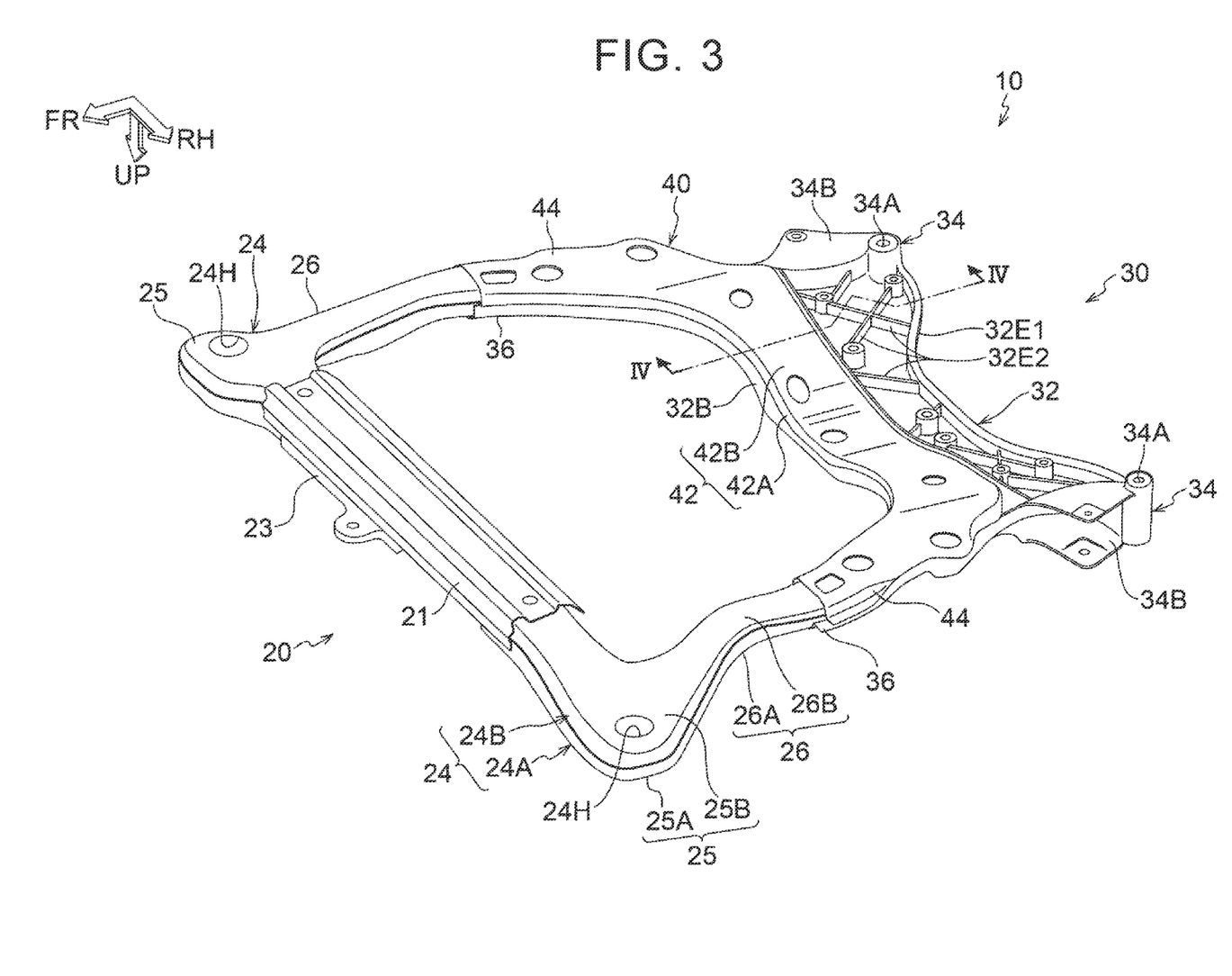
FIG. 3 is a perspective view illustrating the suspension member of the first embodiment when viewed from below.

A suspension member 10 illustrated in FIGS. 1 to 3 is supported in a suspended state on lower sides of respective front parts of a pair of right and left front side members (not shown) extend along the vehicle-body front-rear direction. The after-mentioned pair of right and left front mounting members 24, which are right and left parts of a front end of the suspension member 10, are attached to a front end part on a vehicle-body front side relative to a kick part in the front side member. Further, a pair of right and left fastening portions 34 of the after-mentioned rear frame 30 is attached to a lower end of the kick part.

The suspension member 10 includes a front frame 20 and the rear frame 30 placed behind the front frame 20. The front frame 20 includes a front cross member 22 extending in the vehicle width direction, and a pair of right and left front attachment members 24 joined to both ends of the front cross member 22 in the vehicle width direction. The front attachment member 24 has a generally L-shape in a top view. The front attachment member 24 includes front body mount portions 25 joined to the front cross member 22, and a pair of right and left front side rail portions 26 extending together from respective front body mount portions 25 provided in pair on the right and left sides toward a vehicle-body rear side.

The rear frame 30 includes a rear cross portion 32 extending in the vehicle width direction, a pair of right and left fastening portions 34 formed integrally with both ends of the rear cross portion 32 in the vehicle width direction, and a pair of right and left rear side rail portions 36 formed integrally with respective ends of the rear cross portions 36 in the vehicle width direction and extending from the respective ends of the rear cross portion 32 in the vehicle width direction toward a vehicle-body front side.

The front cross member 22 of the front frame 20 has an elongated shape having a rectangular closed section. The front cross member 22 is formed by extrusion of a light metal material such as aluminum alloy, and has a high ductility. An engine mount bracket 23 is welded and fixed to a center of the front cross member 22. A cross plate 21 is joined to a lower side of the front cross member 22. A lower part of the front cross member 22 is protected by the cross plate 21.

The pair of right and left front attachment members 24 are each divided in an up-down direction. In the following description, in a case where upper and lower front attachment members 24 are distinguished from each other in terms of the up-down direction, one on the upper side is referred to as a front attachment member 24A, and one on the lower side is referred to as a front attachment member 24B. The front attachment member 24A and the front attachment member 24B are each formed to have an open section (a generally U-shaped section) that is opened on a side opposed to its counterpart. The front attachment member 24 is formed by pressing or the like of an aluminum alloy sheet. The front attachment members 24A, 24B include front body mount portions 25A, 25B, respectively, so as to be attached to the front cross member 22 such that an end of the front cross member 22 is sandwiched in the up-down direction by inner ends of the front body mount portions 25A, 25B in the vehicle-width direction. The pair of upper and lower front body mount portions 25A, 25B have attachment holes 24H in a penetrating manner at positions opposed to each other. A fixture 29 is inserted into the attachment holes 24H from the lower side so as to be fastened to the front side member (not shown), so that the front attachment member 24 is attached to the lower side of the front side member (not shown).

Front side rail portions 26 are provided so as to extend rearward from the pair of upper and lower front body mount portions 25A, 25B on each of the right side and the left side. The front side rail portion 26 includes a bending portion 27 in a generally central part thereof in its longitudinal direction (extension direction), the bending portion 27 projecting toward a vehicle-body lower side (having a downward projecting shape) in a side view viewed from the vehicle width direction. In the following description, the front side rail portions 26 are distinguished from each other in terms of the up-down direction, one on the upper side is referred to as a front side rail portion 26A and one on the lower side is referred to as the front side rail portion 26B.

A side reinforcing member 28 is sandwiched between the front side rail portions 26A, 26B provided in pair on the upper and lower sides. The side reinforcing member 28 has an open section having a generally U-shape that is opened on the lower side and is provided so as to extend rearward from the bending portion 27 of the front side rail portion 26. A rear end of the side reinforcing member 28 extends to a rear end of the front side rail portion 26.

Figure 4:
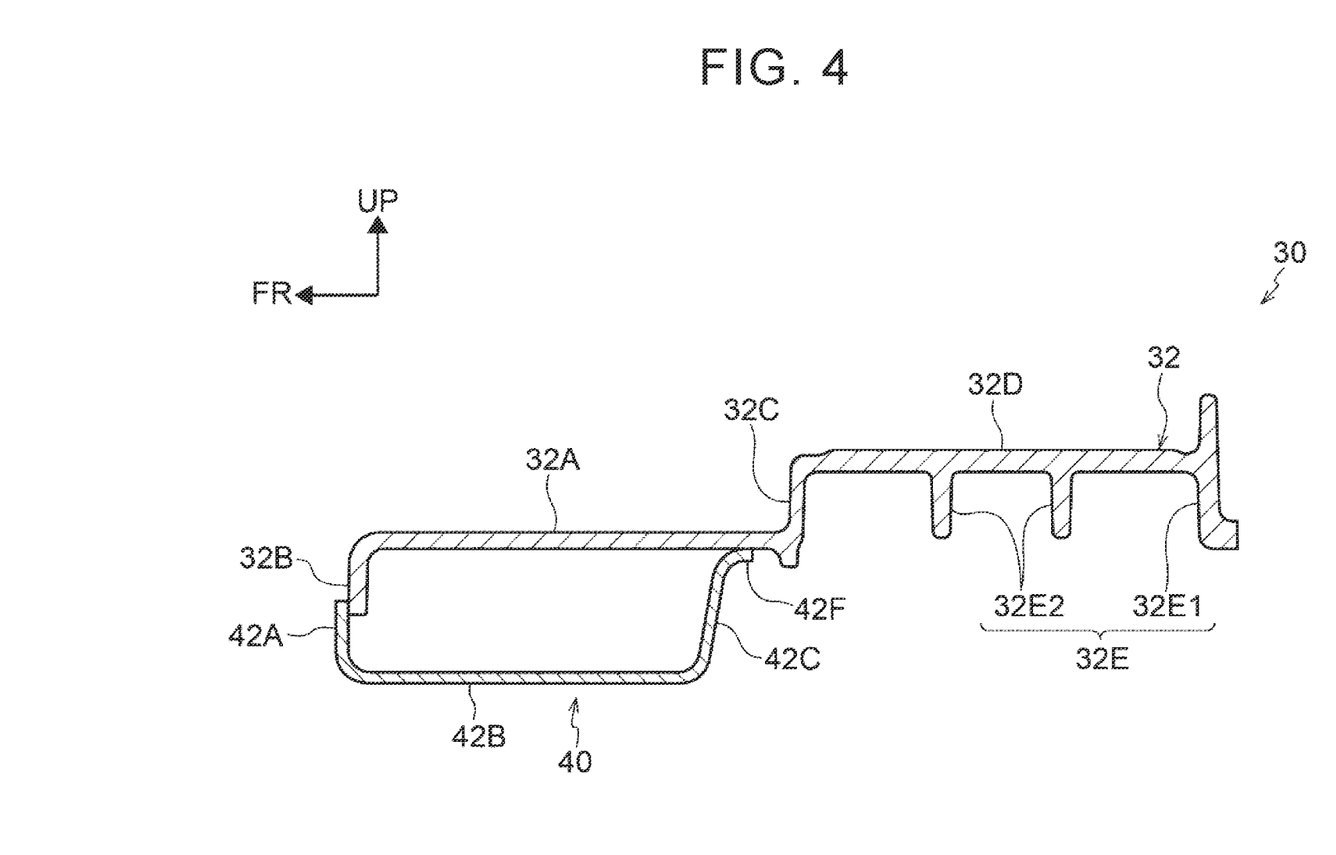
FIG. 4 is a sectional view taken along an arrow IV-IV in FIG. 3.

As illustrated in FIG. 4, the rear cross portion 32 of the rear frame 30 includes a lower cross portion 32A, a front end portion 32B, a stepped portion 32C, a high cross portion 32D, and a rear rib 32E. The lower cross portion 32A has a plate shape, and is provided so as to extend in the vehicle width direction so that a plate surface thereof faces in the up-down direction. The front end portion 32B is formed downward from a front end side of the lower cross portion 32A and is placed so that a plate surface thereof faces in the front-rear direction. The stepped portion 32C is formed upward from a rear end side of the lower cross portion 32A and is placed so that a plate surface thereof faces in the front-rear direction.

The high cross portion 32D is formed from an upper end side of the stepped portion 32C toward the rear side and is placed so that a plate surface thereof faces in the up-down direction. The high cross portion 32D is provided so as to extend in the vehicle width direction at a position higher than the lower cross portion 32A, and a step is formed by the stepped portion 32C between the lower cross portion 32A and the high cross portion 32D. The rear rib 32E is formed so as to project downward from a bottom face of the high cross portion 32D. In the present embodiment, the rear rib 32E includes a rear rib 32E1 formed in a rear end of the high cross portion 32D so as to extend in the vehicle width direction, and a plurality of diagonal ribs 32E2 that diagonally crosses the high cross portion 32D in the vehicle front-rear direction. A bottom end of the rear rib 32E is placed on the upper side relative to a bottom face of the after-mentioned protection cross portion 42.

The fastening portions 34 are formed integrally in both ends of the high cross portion 32D in the vehicle width direction. An attachment hole 34A is formed in the fastening portion 34, and the fastening portion 34 is attached to the lower end of the kick part (not shown) of the front side member via the attachment hole 34A. A lower arm attachment portion 34B to which a lower arm (not shown) constituting a suspension (not shown) is attached is formed on the front side of the fastening portion 34.

The pair of right and left rear side rail portions 36 extending toward the vehicle-body front side are formed on both front sides of the lower cross portion 32A in the vehicle width direction. The pair of right and left rear side rail portions 36 are formed to have an open section (a generally U-shaped section) that is opened on the lower side. A front end of the rear side rail portion 36 is superposed on a rear end of the front side rail portion 26A from the upper side, and the rear side rail portion 36, the front side rail portion 26A, and the side reinforcing member 28 are provided in an overlapping manner and are fixed with a bolt (not shown).

The rear frame 30 is formed by die-casting of a light metal material such as aluminum alloy, integrally with the rear cross portion 32, the fastening portions 34, and the rear side rail portions 36.

A protective member 40 is placed on the lower side of the rear frame 30. The protective member 40 includes: a protection cross portion 42 extending in the vehicle width direction so as to cover a bottom face of the lower cross portion 32A and a lower side of a front face of the front end portion 32B; and protection side portions 44 extending forward from both ends of the protection cross portion 42 in the vehicle width direction so as to cover bottom faces of the rear side rail portions 36. The protective member 40 has a generally U-shape in a top view. The protective member 40 is formed integrally by pressing of a panel made of aluminum alloy.

The protection cross portion 42 has a generally U-shaped section when viewed from the vehicle width direction, and includes: a reinforcement front end portion 42A constituting one linear end part of the U-shape and placed on the front side; a reinforcement bottom portion 42B continuous with the reinforcement front end portion 42A and constituting a U-shaped intermediate part; and a reinforcement rear end portion 42C continuous with the reinforcement bottom portion 42B and constituting the other linear end part of the U-shape so as to be placed on the rear side. The reinforcement front end portion 42A is placed so as to cover the lower side of the front face of the front end portion 32B and is joined thereto by arc-welding. The reinforcement bottom portion 42B is placed so as to be opposed to the lower cross portion 32A in the up-down direction. The reinforcement rear end portion 42C includes a flange 42F formed in its upper end so as to be bent rearward, and the flange 42F is joined to a rear bottom face of the lower cross portion 32A. Hereby, a square closed section is formed by the front end portion 32B, the lower cross portion 32A, the reinforcement front end portion 42A, the reinforcement bottom portion 42B, and the reinforcement rear end portion 42C, 42F. Note that a part of the flange 42F in the vehicle width direction may include a part that is not joined to the lower cross portion 32A.

The protection side portion 44 has a generally U-shaped section when viewed from the vehicle front-rear direction. A front end of the protection side portion 44 is placed slightly on the rear side relative to the front end of the rear side rail portion 36, and is placed so as to cover the lower side of the rear side rail portion 36 and to be joined thereto. In a rear end of a part where the rear side rail portion 36 is joined to the front side rail portion 26A, the protection side portion 44 is linearly joined to the front side rail portion 26B by arc-welding, so as to cover bottom faces of the side reinforcing member 28 and the front side rail portion 26B.

Subsequently, the following describes an operation of the suspension member 10 configured as described above.

In the present embodiment, since the rear frame 30 is formed by die-casting of aluminum alloy, a seating face, a boss, or the like to which other attachment parts are attached can be formed easily. That is, the front frame 20 and the rear frame 30 have a high degree of freedom of the shape, and it is possible to achieve reduction in the number of components (rationalization of the shape).

Further, as described above, in the rear cross portion 32 of the rear frame 30, the bottom face of the lower cross portion 32A and the lower side of the front surface of the front end portion 32B are covered with the protection cross portion 42. Accordingly, an impact such as interference with a load surface or an obstacle on the road surface is input into the protection cross portion 42 constituting a closed section on a lower front side of the rear cross portion 32. Accordingly, it is possible to restrain the rear cross portion 32 formed by die-casting of light metal from being damaged. Particularly, since the road surface or the obstacle on the road surface generally collides with the lower front side of the rear cross portion 32, it is possible to effectively project the rear cross portion 32 by covering the bottom face of the lower cross portion 32A of the rear cross portion 32 and the lower side of the front face of the front end portion 32B with the protection cross portion 42.

Further, the protection cross portion 42 is made of aluminum alloy, so that it is possible to restrain an increase in weight of the vehicle. Further, since the protection cross portion 42 constitutes a closed section together with the rear cross portion 32, it is possible to improve a sectional mass efficiency and to receive the impact from outside by the protection cross portion 42.

Further, since the protection side portion 44 of the rear frame 30 covers the lower side of the rear side rail portion 36, it is possible to restrain the damage of the rear side rail portion 36 formed by die-casting of light metal. Further, since the protection side portion 44 is joined to the rear end (a part joined to the rear side rail portion 36) of the front side rail portion 26B constituting a part of the front frame 20, it is possible to reinforce the joining between the front frame 20 and the rear frame 30.

Since the rear rib 32E is formed on a bottom face of the rear frame 30 of the rear cross portion 32, the bottom face being not covered with the protection cross portion 42, it is possible to increase the rigidity of the whole rear cross portion 32.

Note that, in the present embodiment, the rear frame 30 is made of aluminum alloy, but the rear frame 30 may be made of other light metal. Further, the protective member 40 is also not limited to aluminum, but may be made of other light metal. When they are made of light metal as such, the vehicle can be reduced in weight. Further, by forming the rear frame 30 and the protective member 40 by use of the same material, it is possible to prevent different metal contact corrosion (electrolytic corrosion).

Further, in the present embodiment, the protective member 40 is formed by pressing of an aluminum alloy plate, but may be formed by other techniques. When the pressing of an aluminum alloy plate is used, the protective member 40 is relatively easily elongated. Accordingly, when an impact is input from the load surface, the obstacle on the road surface, or the like, it is possible to absorb an impact by deformation. Further, the protective member 40 may be formed by pressing of a light metal plate other than the aluminum alloy plate.

Further, in the present embodiment, the lower cross portion 32A and the protection cross portion 42 form a square closed section, but the shape of the closed section is not limited to the square, and may be a semicircular closed section that is curved in a projecting manner on the lower side, for example. When the closed section is square like the present embodiment, it is possible to enlarge a closed section formed by the protection cross portion 42 having a limitation on the lower end, thereby making it possible to increase the rigidity.

Further, in the present embodiment, since the rear rib 32E is formed in the high cross portion 32D, it is possible to increase the rigidity of a rear part of the rear cross portion 32, the rear part being not covered with the protection cross portion 42.

Second Embodiment

Next will be described a second embodiment of the disclosure with reference to FIGS. 5 to 8. In the present embodiment, a part similar to the first embodiment has the same reference sign as in the first embodiment, and a detailed description thereof is omitted.

Figure 5:
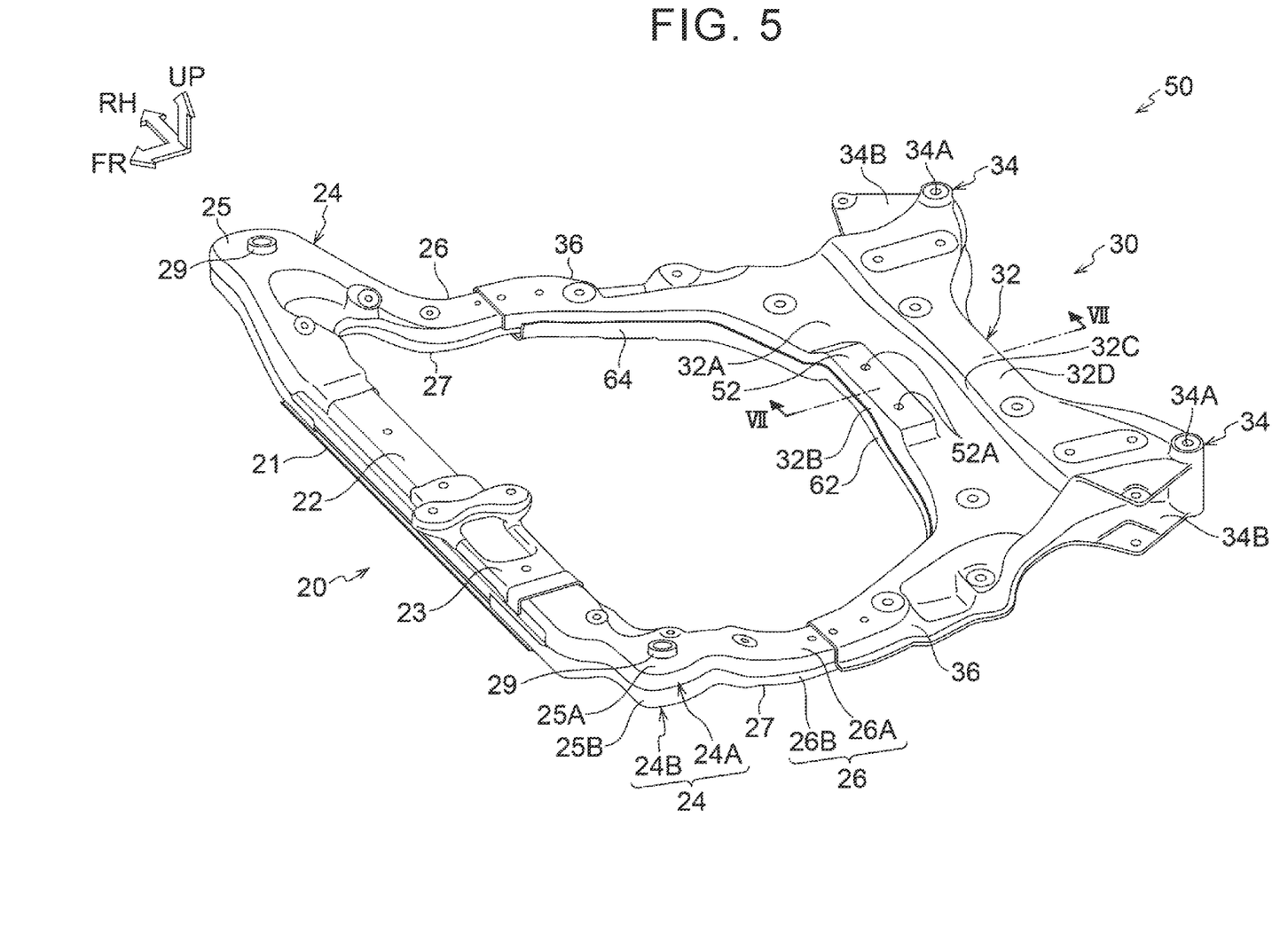
FIG. 5 is a perspective view illustrating a suspension member of a second embodiment when viewed from above.
Figure 6:
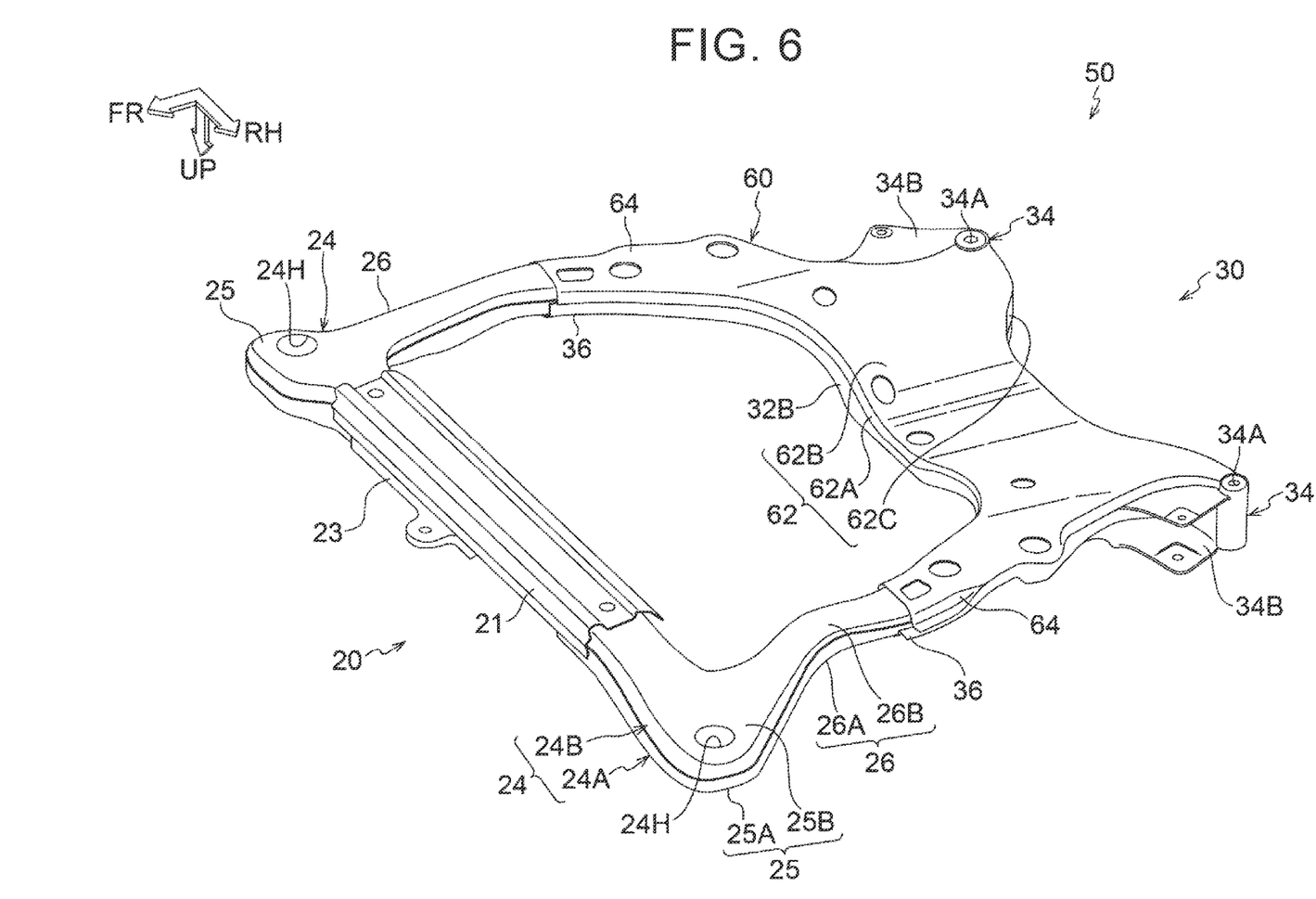
FIG. 6 is a perspective view illustrating the suspension member of the second embodiment when viewed from below.
Figure 7:
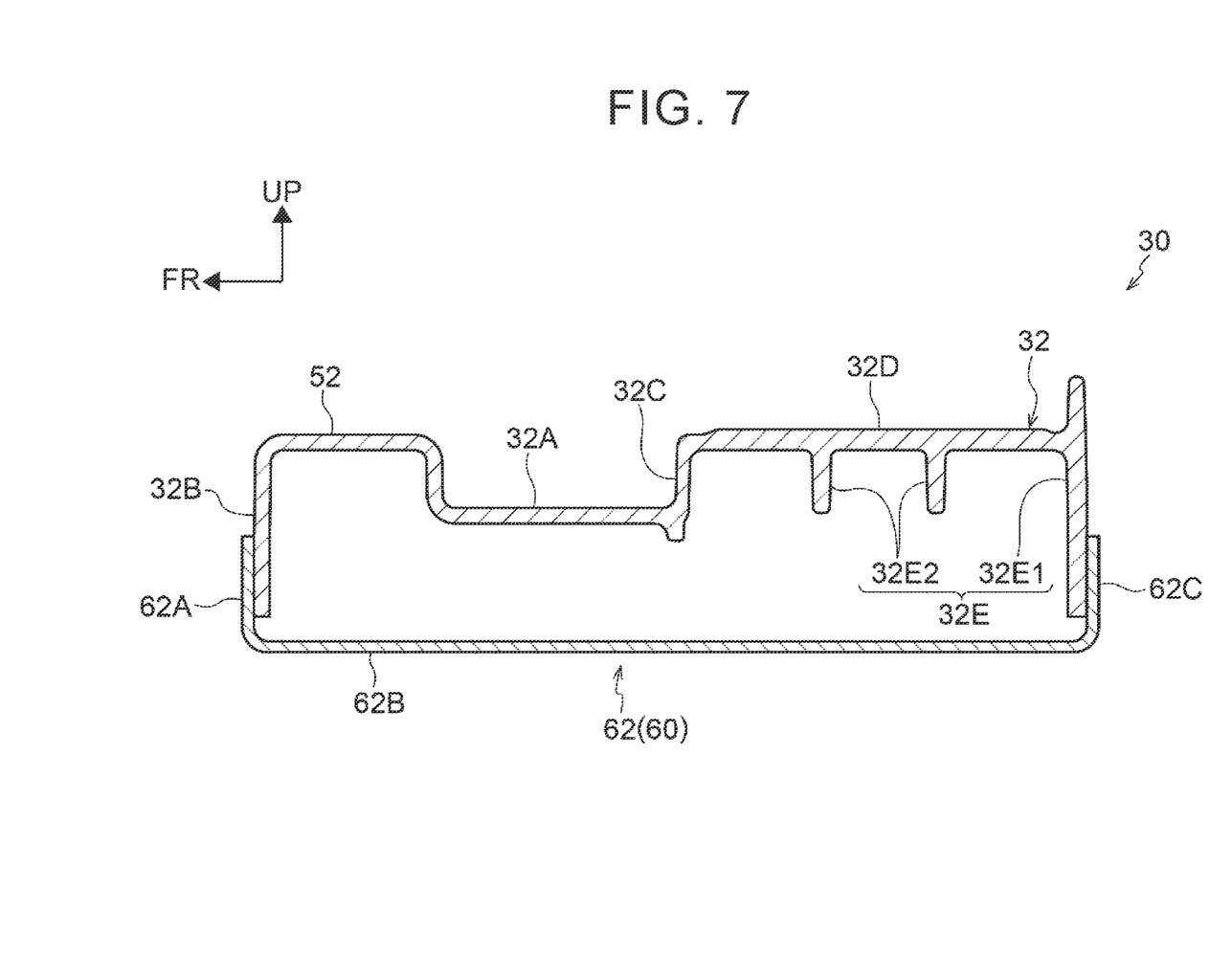
FIG. 7 is a sectional view taken along an arrow VII-VII in FIG. 5.

A suspension member 50 of the second embodiment is configured such that a pedestal portion 52 on which an engine mount (not shown) is to be provided is formed in a central part, in the vehicle width direction, of the rear cross portion 32 of the rear frame 30 of the first embodiment. Further, a second protective member 60 is provided instead of the protective member 40 of the first embodiment.

As illustrated in FIGS. 5 and 7, the pedestal portion 52 is formed integrally with the rear cross portion 32 such that a central part of the rear cross portion 32 in the vehicle width direction projects upward. An attachment hole 52A for attachment of the engine mount is formed in the pedestal portion 52.

As illustrated in FIG. 6, the second protective member 60 is placed on the lower side of the rear frame 30. The second protective member 60 includes: a second protection cross portion 62 extending in the vehicle width direction so as to cover a bottom face of the rear cross portion 32, a lower side of a front face of a front end portion 32B, and a lower side of a rear face of a rear rib 32E1; and second protection side portions 64 extending forward from both ends of the second protection cross portion 62 in the vehicle width direction so as to cover bottom faces of rear side rail portions 36. The second protective member 60 has a generally U-shape in a top view. The second protective member 60 is made of a steel sheet in an integrated manner.

The second protection cross portion 62 has a generally U-shaped section when viewed from the vehicle width direction. The second protection cross portion 62 includes: a second reinforcement front end portion 62A constituting one linear end part of the U-shape and placed on the front side; a second reinforcement bottom portion 62B continuous with the second reinforcement front end portion 62A and constituting a U-shaped intermediate part; and a second reinforcement rear end portion 62C continuous with the second reinforcement bottom portion 62B and constituting the other linear end part of the U-shape so as to be placed on the rear side. The second reinforcement front end portion 62A is placed so as to cover the lower side of the front face of the front end portion 32B and is joined thereto by arc-welding. The second reinforcement bottom portion 62B is placed so as to be opposed to the rear cross portion 32 in the up-down direction. The second reinforcement rear end portion 62C is placed so as to cover the lower side of the rear face of the rear rib 32E1 and is joined thereto by arc-welding. Hereby, a closed section is formed by the second protective member 60 and the rear cross portion 32.

The second protection side portion 64 has a generally U-shaped section when viewed from the vehicle front-rear direction. A front end of the second protection side portion 64 is placed slightly on the rear side relative to the front end of the rear side rail portion 36, and is placed so as to cover the lower side of the rear side rail portion 36 and to be joined thereto. In a rear end of a part where the rear side rail portion 36 is joined to the front side rail portion 26A, the second protection side portion 64 is linearly joined to the front side rail portion 26B by arc-welding, so as to cover bottom faces of the side reinforcing member 28 and the front side rail portion 26B.

Since the suspension member 50 of the present embodiment is configured such that the bottom face of the rear cross portion 32 is covered with the second protective member 60 made of a steel sheet, it is possible to restrain the rear cross portion 32 formed by die-casting of light metal from being damaged.

Further, since a closed section is formed by the second protective member 60 and the rear cross portion 32, the rigidity is increased in comparison with a case where the closed section is not formed. Accordingly, at the time of a front collision, even if an engine, a transmission, a power unit, or the like moves rearward relative to a vehicle body so as to collide with the rear cross portion 32, it is possible to restrain the rear cross portion 32 from breaking.

Figure 8:
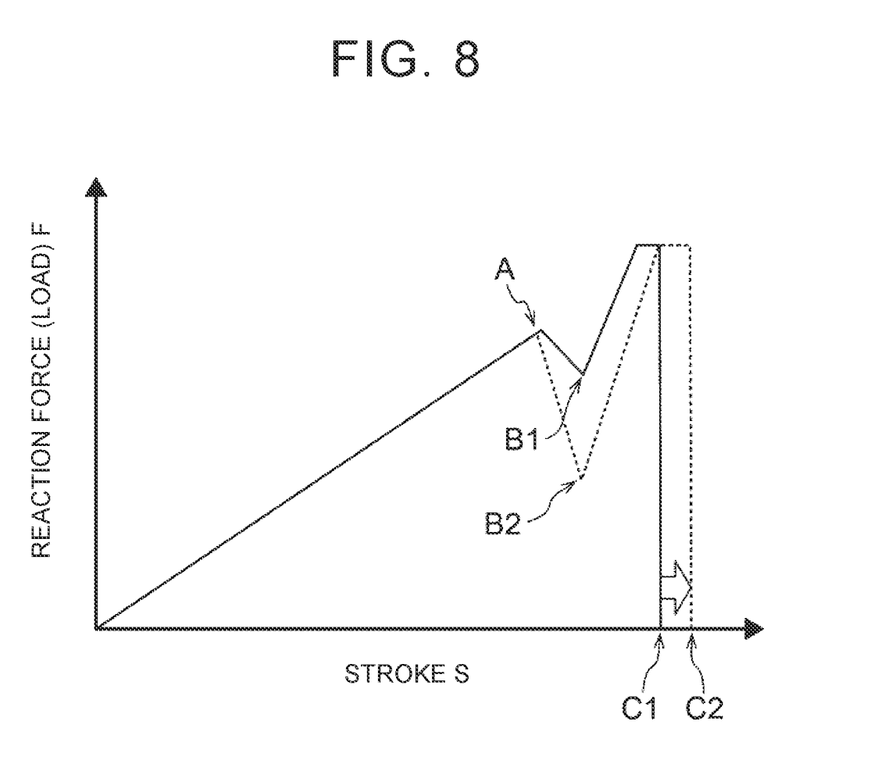
FIG. 8 is a graph illustrating a relationship between a load applied to a rear cross portion and a stroke.

FIG. 8 illustrates a relationship between a reaction force F received by an object, such as a power unit, provided in the vehicle from the rear cross portion 32 and a moving amount (a stroke S) toward the vehicle rear side at the time of a front collision. As indicated by a continuous line, when the object provided in the vehicle hits the rear cross portion 32, the rear cross portion 32 moves rearward, so that the reaction force F is applied to the object provided in the vehicle. When the stroke S reaches A, the rear cross portion 32 deforms and the reaction force F decreases. However, when the rear cross portion 32 moves further rearward and the stroke B reaches B1, the object provided in the vehicle receives a reaction force from a dash panel or the like placed on the rear side relative to the rear cross portion 32, and the reaction force F increases again. When the stroke S reaches C1, the movement due to the impact stops.

In the meantime, FIG. 8 illustrates, by a dotted line, a relationship between the reaction force (load) F and the stroke S when the rear cross portion breaks. When the stroke S reaches A and the rear cross portion breaks, the reaction force F greatly decreases. Accordingly, even if the rear cross portion moves rearward and the stroke B reaches B2 so that the rear cross portion hits the dash panel or the like and the reaction force is recovered, a long stroke S (up to C2) is required to absorb an impact in order to stop the movement due to the impact. In the present embodiment, since the breakage of the rear cross portion 32 is restrained, it is possible to appropriately absorb the impact while maintaining the reaction force, as indicated by the continuous line.

Further, in the present embodiment, the second reinforcement front end portion 62A of the second protection cross portion 62 is joined to the front end portion 32B of the rear cross portion 32, and the second reinforcement rear end portion 62C of the second protection cross portion 62 is joined to the rear rib 32E1 of the rear cross portion 32. Accordingly, in comparison with a case where the intermediate part of the second protection cross portion 62 in the vehicle front-rear direction is joined to the second reinforcement front end portion 62A and the second reinforcement rear end portion 62C of the second protection cross portion 62 so as to form the closed section, it is possible to enlarge the closed section and to further increase the rigidity of the rear cross portion 32.

Note that, in the present embodiment, the second protective member 60 is made of a steel sheet, but the second protective member 60 may be made of aluminum. Even in this case, since a closed section is formed by the second protective member 60 and the rear cross portion 32, it is possible to restrain the breakage of the rear cross portion 32 just by the increase of the rigidity.

Third Embodiment

Next will be described a third embodiment of the disclosure with reference to FIG. 9. In the present embodiment, a part similar to the first and second embodiments has the same reference sign as in the first and second embodiments, and a detailed description thereof is omitted.

Figure 9:
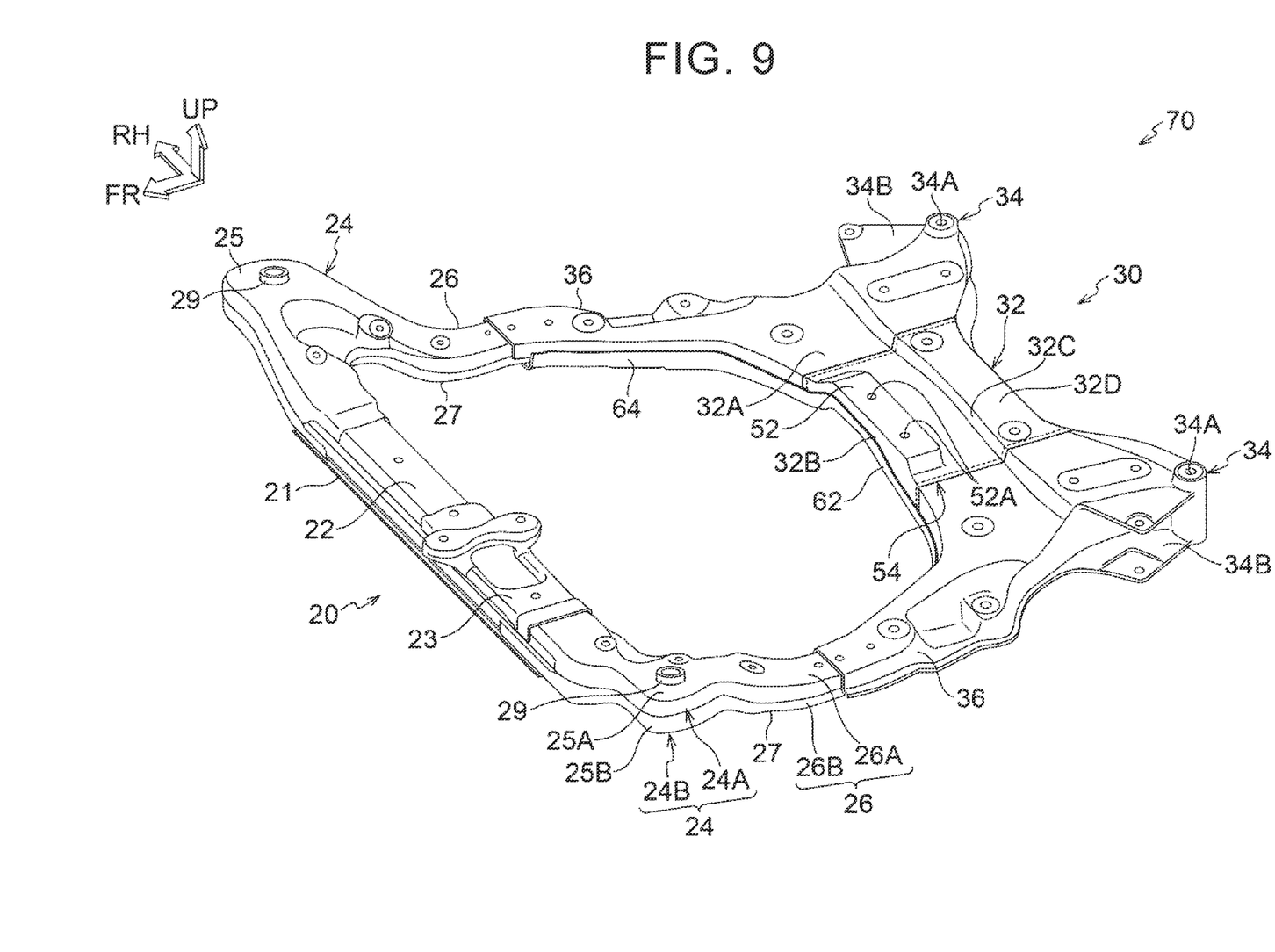
FIG. 9 is a perspective view illustrating a suspension member of a third embodiment when viewed from above.

As illustrated in FIG. 9, a suspension member 70 of the present embodiment is configured such that the central part, in the vehicle width direction, of the rear cross portion 32 of the rear frame 30 of the second embodiment serves as a central steel sheet portion 54 made of a steel sheet. The central steel sheet portion 54 has a shape similar to the central part of the rear cross portion 32 of the second embodiment. The rear cross portion 32 is configured such that an aluminum part of the central part in the vehicle width direction is replaced with the central steel sheet portion 54. Both ends of the central steel sheet portion 54 in the vehicle width direction are put on an edge of the aluminum part of the rear cross portion 32 and joined thereto by Self-Piercing Riveting (SPR). A second protective member 60 is placed on the lower side of the rear cross portion 32 including the central steel sheet portion 54, similarly to the second embodiment, and a closed section is formed by the second protective member 60 and the rear cross portion 32.

The suspension member 70 of the present embodiment also yields the same effect as the second embodiment. Further, in the present embodiment, since the central part of the rear cross portion 32 is the central steel sheet portion 54 made of the steel sheet, it is possible to increase the strength of the rear cross portion 32.

Note that, even in the present embodiment, the second protective member 60 may be made of aluminum.

Fourth Embodiment

Figure 10:
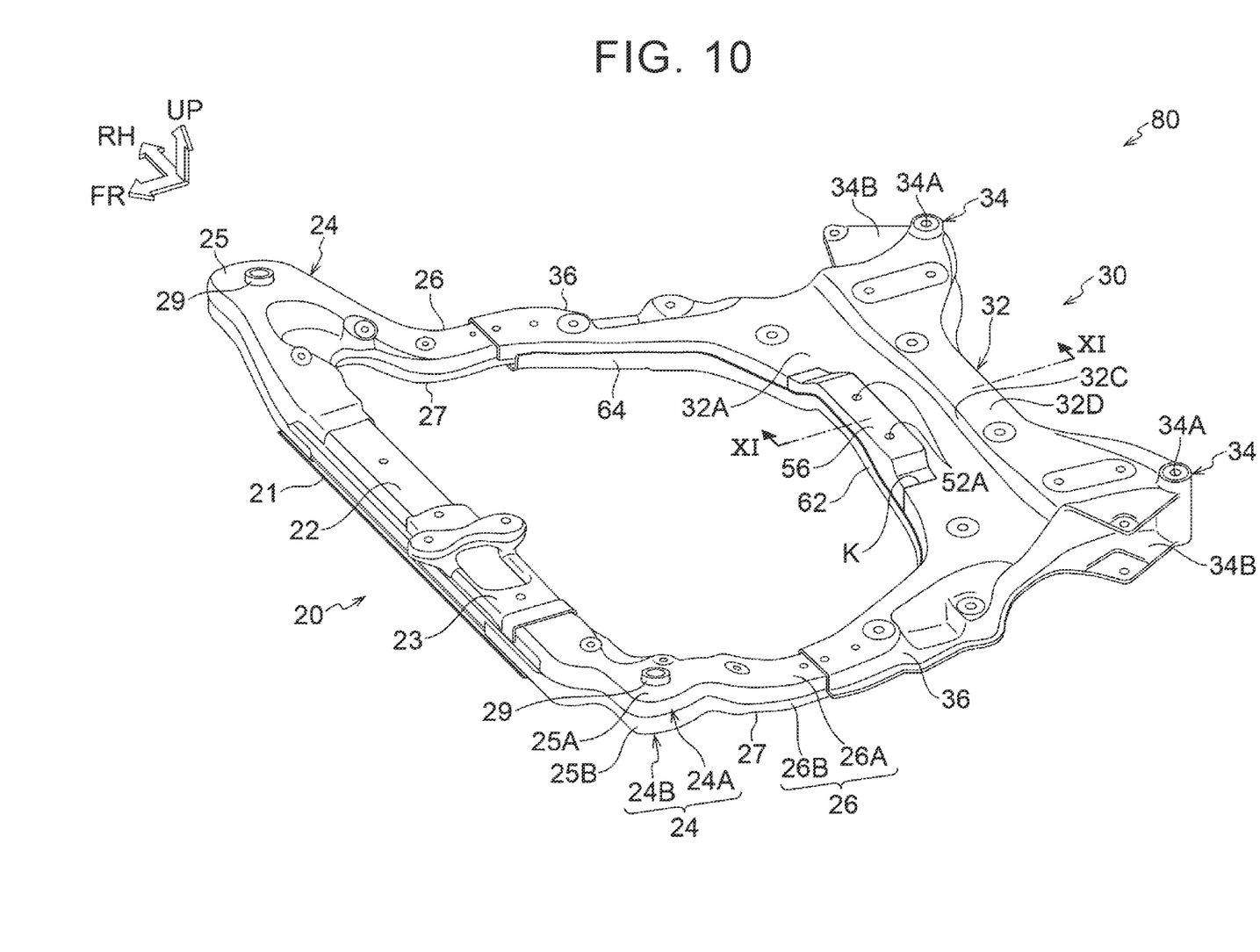
FIG. 10 is a perspective view illustrating a suspension member of a fourth embodiment when viewed from below.
Figure 11:
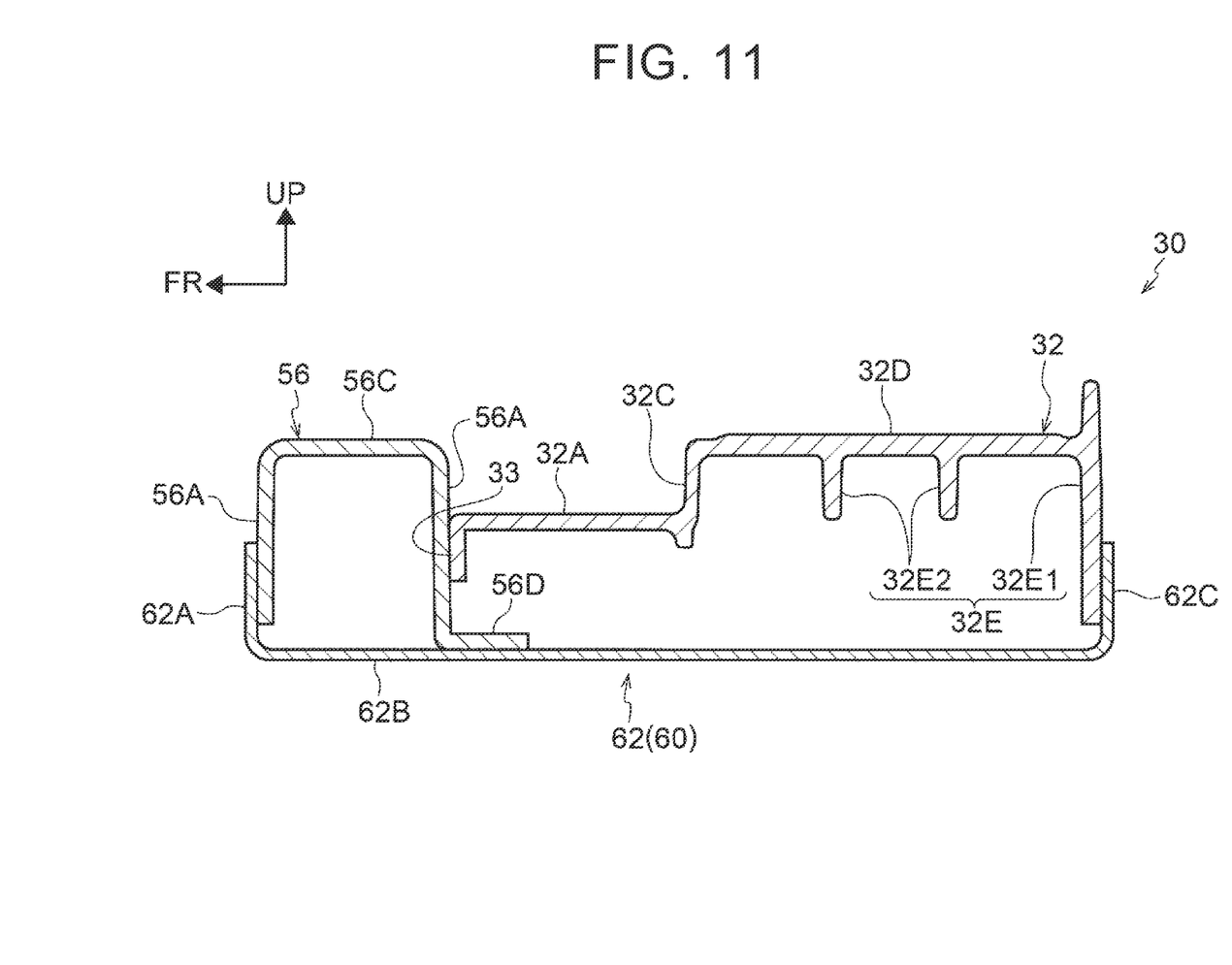
FIG. 11 is a sectional view of a rear cross portion of the fourth embodiment, taken along an arrow XI-XI in FIG. 10.

Next will be described a fourth embodiment of the present disclosure with reference to FIGS. 10, 11. In the present embodiment, a part similar to the first to third embodiments has the same reference sign as in the first to third embodiments, and a detailed description thereof is omitted.

A suspension member 80 of the present embodiment is configured such that the front side of the central part, in the vehicle width direction, of the rear cross portion 32 of the rear frame 30 of the second embodiment is partially cut out. An end 33 folded downward is formed in an edge of a notch part K.

A forward rear cross portion 56 made of a steel sheet is placed in the notch part K. As illustrated in FIG. 11, the forward rear cross portion 56 has a reverse U-shaped section in the vehicle width direction such that a second-protective-member-60 side is opened, and includes: a front end portion 56A constituting the vehicle front side of the U-shape; a rear end portion 56B constituting the vehicle rear side of the U-shape; a top face portion 56C connecting the front end portion 56A and the rear end portion 56B; and a leg portion 56D extending toward the vehicle rear side from a bottom end of the rear end portion 56B.

The forward rear cross portion 56 is configured such that a second reinforcement front end portion 62A is placed so as to cover a lower side of a front face of the front end portion 56A, and an end 33 abuts with by an intermediate part of the rear end portion 56B. The leg portion 56D of the forward rear cross portion 56 is joined to the second reinforcement bottom portion 62B of the second protective member 60. Hereby, a front closed section is formed by the second protective member 60 and the front end portion 56A, the rear end portion 56B, and the top face portion 56C of the forward rear cross portion 56, and a closed section is formed by the second protective member 60, the rear end portion 56B of the forward rear cross portion 56, and a part of the rear cross portion 32 on the rear side relative to the forward rear cross portion 56.

The suspension member 80 of the present embodiment also yields the same effect as the second embodiment. Further, in the present embodiment, the forward rear cross portion 56 made of a steel sheet is formed on the front side of the central part of the rear cross portion 32. The forward rear cross portion 56 forms a closed section with the second protective member 60. Accordingly, it is possible to increase the rigidity of the rear cross portion 32. Further, since the forward rear cross portion 56 is made of a steel sheet, it is also possible to increase the strength of the rear cross portion 32.

Note that, in the present embodiment, the second protective member 60 may be made of aluminum alloy.

Further, the first to fourth embodiments deal with an example in which the protective member 40 or the second protective member 60 is joined to the rear frame 30 by arc-welding. However, the protective member 40 or the second protective member 60 may be joined to the rear frame 30 by joining by the other means such as fastening with a bolt.

What is claimed is:

1. A suspension member comprising:
a front frame including a front cross member extending in a vehicle width direction;
a rear frame at least partially made of metal, the rear frame including a rear cross member extending in the vehicle width direction, the rear cross member including a plurality of ribs projecting downward in a vehicle up-down direction, which is a direction orthogonal to the vehicle width direction, from a bottom face of the rear cross member, the plurality of ribs being located on a rear portion of the bottom surface of the rear cross member in a vehicle front-rear direction, the rear frame being placed on a vehicle rear side of the front frame and joined to the front frame; and
a protective member joined to the rear cross member so as to form a closed section together with the rear cross member, the protective member covering a front end of the rear cross member from a front side of the rear cross member in the vehicle front-rear direction, the protective member covering a portion of the rear cross member located at a position forward of the plurality of ribs in the vehicle front-rear direction, the protective member covering the bottom face of the rear cross member from a lower side of the rear cross member in the vehicle up-down direction.

2. The suspension member according to claim 1, wherein at least one of the rear cross member and the protective member is partially made of iron.

3. The suspension member according to claim 2, wherein:
the closed section is formed over a whole length of the rear cross member in a longitudinal direction of the rear cross member; and
the closed section is partially made of iron in a whole area of the rear cross member in the longitudinal direction of the rear cross member.

4. The suspension member according to claim 1, wherein the protective member is joined to the front end and a rear end of the rear cross member in the vehicle front-rear direction so as to form the closed section.

5. The suspension member according to claim 1, wherein:
the rear cross member includes a forward rear cross portion made of iron at a position including a center of the rear cross member, in the vehicle width direction, on the front side of the rear cross member in the vehicle front-rear direction; and
a front closed section is formed by the protective member and the forward rear cross portion.

6. The suspension member according to claim 1, wherein the protective member is made of metal.

7. The suspension member according to claim 1, wherein:
the protective member is connected to a front end of the rear cross member in the vehicle front-rear direction from the front side in the vehicle front-rear direction; and
the protective member is connected to a surface of the rear cross member on the lower side of the rear cross member in the vehicle up-down direction or a rear end of the rear cross member in the vehicle front-rear direction.

* * * * *